US012632774B2

(12) United States Patent
Yen et al.

(10) Patent No.: US 12,632,774 B2
(45) Date of Patent: May 19, 2026

(54) AUTOMATED MODEL UPDATE PIPELINE

(71) Applicant: Verizon Media Inc., New York, NY (US)

(72) Inventors: Cheng-En Yen, New Taipei City (TW); Yi-Ting Tsao, New Taipei City (TW); Yu-Ting Chang, Taipei City (TW); Chi-Chia Huang, New Taipei City (TW); Peng-Yu Chen, Taipei City (TW); Tzu-Chiang Liou, New Taipei City (TW)

(73) Assignee: Yahoo Assets LLC, New York, NY (US)

( * ) Notice: Subject to any disclaimer, the term of this patent is extended or adjusted under 35 U.S.C. 154(b) by 1149 days.

(21) Appl. No.: 17/164,947

(22) Filed: Feb. 2, 2021

(65) Prior Publication Data

US 2022/0245507 A1 Aug. 4, 2022

(51) Int. Cl.
*G06N 20/00* (2019.01)
*G06N 7/01* (2023.01)

(52) U.S. Cl.
CPC .............. *G06N 20/00* (2019.01); *G06N 7/01* (2023.01)

(58) Field of Classification Search
CPC .......... G06N 20/00; G06N 7/01; G06N 20/20; G06Q 50/00; H04W 28/00; G05B 2219/31346; G01V 1/04
See application file for complete search history.

(56) References Cited

U.S. PATENT DOCUMENTS

2018/0218287 A1* 8/2018 Wang ................. G06Q 30/0201
2021/0044674 A1* 2/2021 Govan ................... G06Q 50/01
2021/0326736 A1* 10/2021 Kishimoto ........... G06F 18/217
2022/0188371 A1* 6/2022 Kaza ................... G06F 16/9538

OTHER PUBLICATIONS

Kaufmann, Emilie, Olivier Cappe, and Aurélien Garivier. "On Bayesian upper confidence bounds for bandit problems." Artificial intelligence and statistics. PMLR, 2012. (Year: 2012).*
Wikipedia. Multi-armed bandit. Article version from Dec. 6, 2020. https://en.wikipedia.org/w/index.php?title=Multi-armed_bandit &oldid=992718805. (Year: 2020).*

* cited by examiner

*Primary Examiner* — Markus A. Vasquez
(74) *Attorney, Agent, or Firm* — Cooper Legal Group LLC

(57) ABSTRACT

One or more computing devices, systems, and/or methods for implementing an automated model update pipeline are provided. User behavior data associated with content provided to users may be collected. An automatic model training is invoked to train a new model to output a set of model parameters based upon a configuration specifying a target audience, features extracted from user behavior data, and training model parameters. In response to determining that the new model will outperform a deployed model on a content serving platform, an automatic model updater is invoked to update the content serving platform with the new model and a ranking profile of the new model for serving content requests.

20 Claims, 9 Drawing Sheets

400

402 COLLECT USER BEHAVIOR DATA

404 INVOKE AUTOMATIC MODEL TRAINER TO TRAIN NEW MODEL

406 DETERMINE PERFORMANCE OF NEW MODEL OFFLINE

408 INVOKE AUTOMATIC MODEL UPDATER TO UPDATE CONTENT SERVING SYSTEM WITH NEW MODEL

410 UTILIZE ONLINE EVALUATION MECHANISM TO SCORE MODELS

412 DYNAMICALLY SHIFT TRAFFIC FOR SERVING CONTENT REQUESTS BASED UPON SCORES OF MODELS

400

COLLECT USER BEHAVIOR DATA — 402

INVOKE AUTOMATIC MODEL TRAINER TO TRAIN NEW MODEL — 404

DETERMINE PERFORMANCE OF NEW MODEL OFFLINE — 406

INVOKE AUTOMATIC MODEL UPDATER TO UPDATE CONTENT SERVING SYSTEM WITH NEW MODEL — 408

UTILIZE ONLINE EVALUATION MECHANISM TO SCORE MODELS — 410

DYNAMICALLY SHIFT TRAFFIC FOR SERVING CONTENT REQUESTS BASED UPON SCORES OF MODELS — 412

500

Figure 5B:
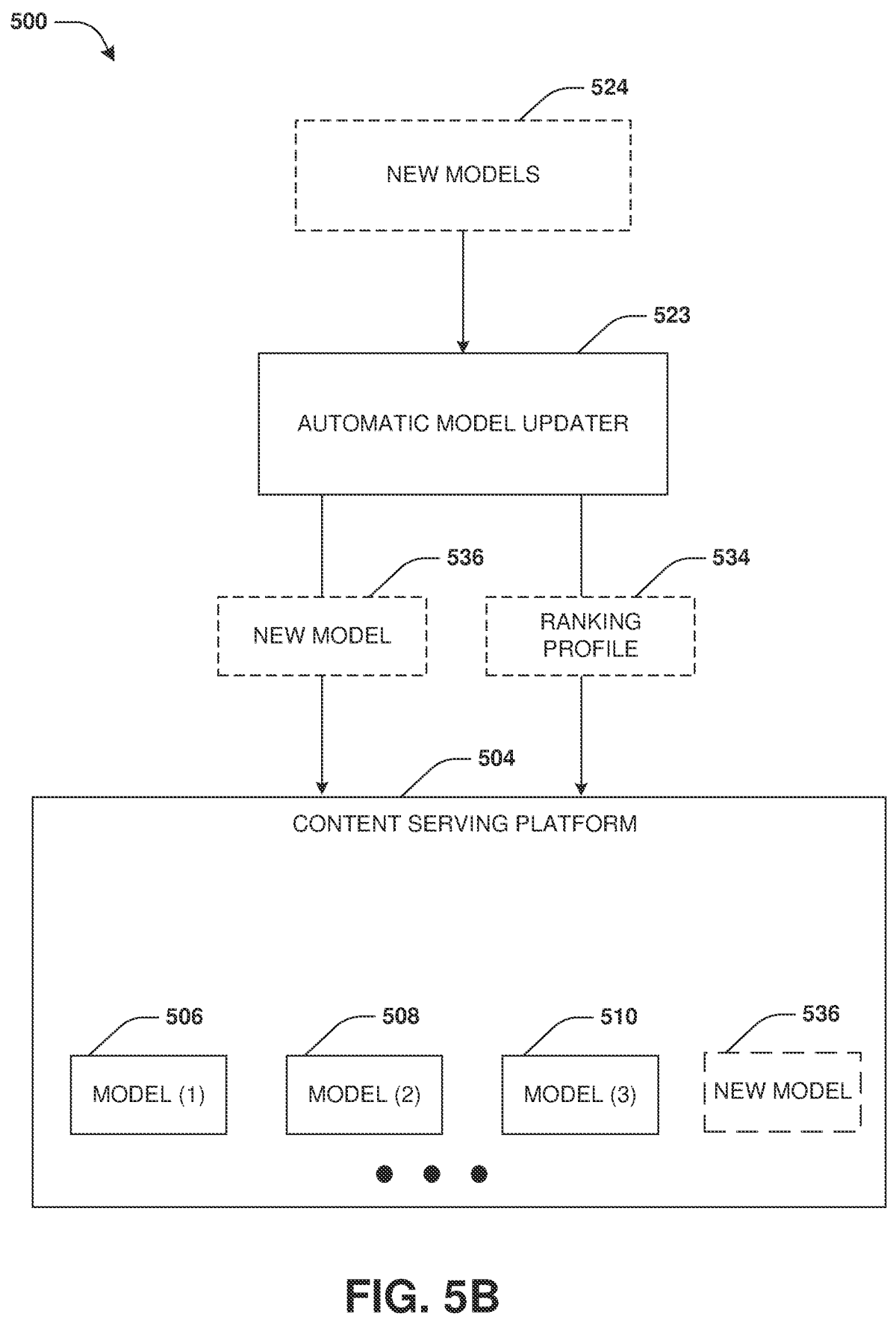

500 —

524

NEW MODELS

523

AUTOMATIC MODEL UPDATER

536

NEW MODEL

534

RANKING
PROFILE

504

CONTENT SERVING PLATFORM

506

MODEL (1)

508

MODEL (2)

510

MODEL (3)

536

NEW MODEL

AUTOMATED MODEL UPDATE PIPELINE

BACKGROUND

Many different service providers may utilize machine learning functionality, such as models, to perform various tasks related to services provided by the service providers. In an example, a recommendation service provider may utilize a model to predict likelihoods that users will be interested in and/or interact with certain recommendations, such as restaurant recommendations, refrigerator recommendations, videogame recommendations, etc. The model may utilize information about a user (e.g., user features) and/or a recommendation (e.g., content features) to assign a score to the recommendation as to how likely the user would view and/or interact with the recommendation. In this way, available recommendations may be scored, and a recommendation with a highest score may be provided to the user. Models may be utilized by service providers to perform other tasks, such as user related prediction tasks, article and content recommendations, user interaction prediction, user segmentation and lookalike modeling, etc.

SUMMARY

In accordance with the present disclosure, one or more computing devices and/or methods for implementing an automated model update pipeline are provided. Users may perform various activities that may be tracked by service providers and/or client devices as user behavior data. The user behavior data may correspond to search queries submitted by the users, messages sent and received by the users (e.g., emails, text messages, etc.), social network messages/posts, browsing history (e.g., websites visited by the users), locations visited by the users, purchases made by the user, content viewed by the users, content interactions where users interacted with or ignored particular content (e.g., notifications, recommendations, links to websites or services, etc.), etc. For example, the user behavior data may indicate that a particular content item (e.g., a message, an image, a video, a recommendation, a link, an ability to purchase a product or service, etc.) was provided to a user (e.g., displayed through a user interface, emailed to the user, provided as a message or push notification, etc.). The user behavior data may indicate whether and what actions the user took with respect to the content item, such as whether the user viewed the content item, clicked the content item, purchased a product or service after viewing the content item, created an account after viewing the content item, etc.

An automatic model trainer is invoked, such as on a periodic basis, to obtain up-to-date user behavior data. The automatic model trainer extracts features from the up-to-date user behavior data. The automatic model trainer is configured to train a new model to output a set of model parameters based upon a configuration specifying the features, a target audience, and training model parameters. An offline evaluation of the new model may be performed to predict performance of the new model based upon evaluation metrics. The evaluation metrics may correspond to precision, recall, area under curve, normalized discounted cumulative gain, and/or other types of evaluation metrics. The performance of the new model may be compared to the performance of a deployed model of a content serving platform (e.g., a service provider that provides content, recommendations, or other data and information to users; a website host; an email service provider; a social network service provider; etc.) to determine whether the new model out performs the deployed model.

If the new model outperforms the deployed model, then an automatic model updater is invoked to automatically update the content serving platform with the new model and a ranking profile of the new model for serving content requests. In this way, the new model is used to serve the content requests. An online evaluation mechanism may be implemented to score a plurality of models, such as the new model and the deployed model, available to the content serving platform. The scores may relate to whether a model selected content to provide to a user that resulted in the user interacting with the content. For example, a larger score may be assigned to a model that selected content to provide to users that ended up view, clicking, and/or performing actions in response to the content. A lower score may be assigned to a model that selected content to provide to users that ended up ignoring and/or not interacting with the content. In an embodiment, the online evaluation mechanism may implement a multi-armed bandit mechanism to score the plurality of models. The multi-armed bandit mechanism may be implemented based upon a Bayesian upper confidence bounds algorithm to select a model from the plurality of models to route incoming traffic for serving the content requests. For example, a model with a higher score than other models may be selected for serving traffic (e.g., used to select content to provide to users in response to content requests). In this way, traffic for serving content requests may be dynamically shifted amongst the plurality of models, such as new models that are automatically generated on a periodic basis using up-to-date user behavior data, based upon the performance of the plurality of models.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5B is a component block diagram illustrating an example system for implementing an automated model update pipeline, where a new model is deployed.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
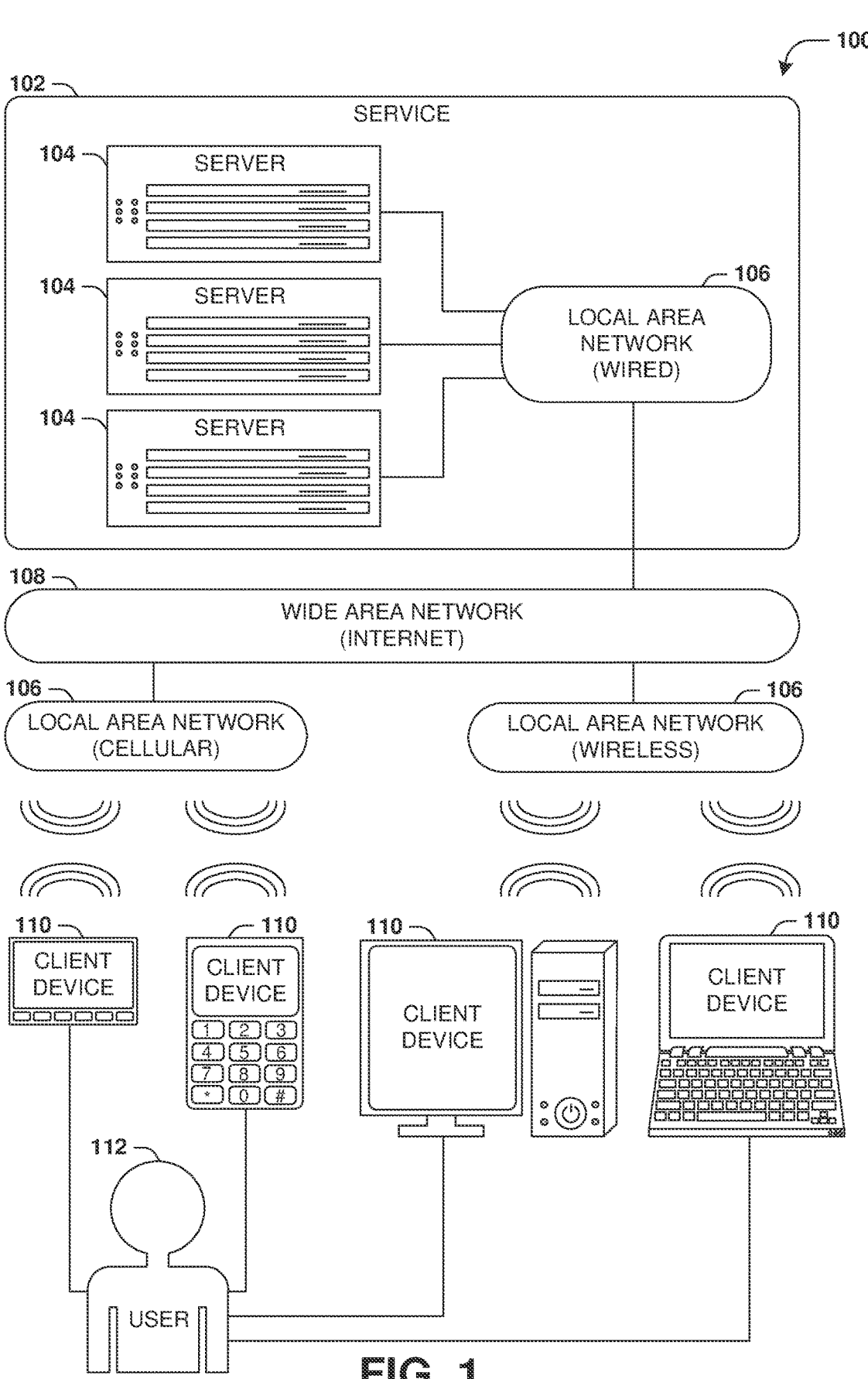
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figures 2, 3:
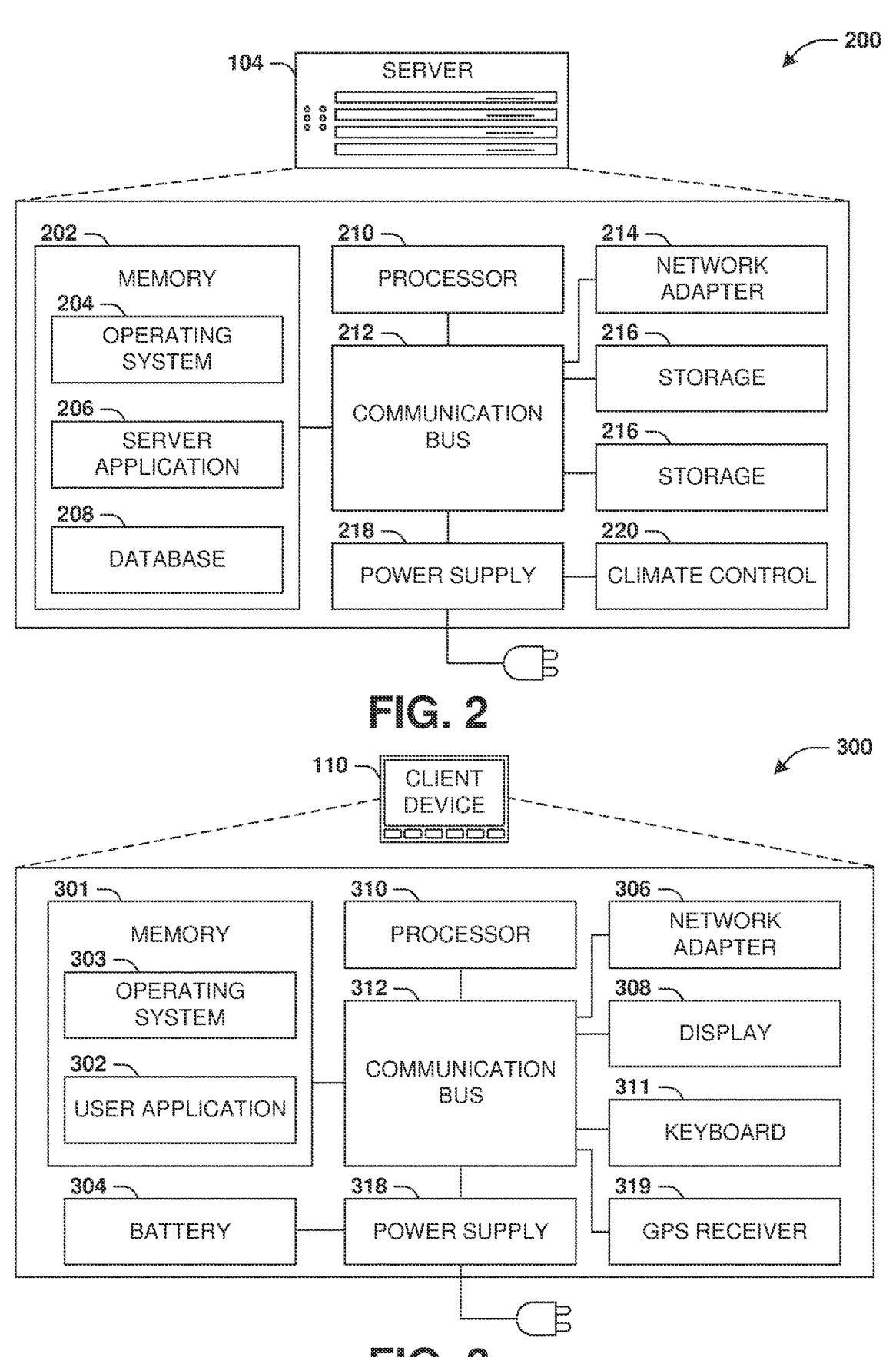
FIG. 2 is an illustration of a scenario involving an example configuration of a server that may utilize and/or implement at least a portion of the techniques presented herein.
FIG. 3 is an illustration of a scenario involving an example configuration of a client that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for implementing an automated model update pipeline are provided. Content serving platforms may provide various types of content to users, such as images, social network posts, recommendations, emails or other types of messages, websites, application data, videos, videogames, etc. A content serving platform may utilize models to select what content to provide to particular users. The models may implement various types of machine learning algorithms and/or model parameters to process user features of users (e.g., a user age, a user gender, content the user previously interacted with or ignored, user profile information, user browsing history, user search history, location, career, and/or a wide variety of other information about the users) and/or content features of content (e.g., topics and/or categories of content, such a topic of an article, what is depicted in an image, a type of product or service being recommended by a recommendation, etc.). The models may process the user features of the users and/or the content features of the content in order to select a particular content item to provide to a particular user based upon the content item having a relatively high predicted likelihood of being engaged with by that user.

Once a model is deployed to a content serving platform, the model is used to serve the traffic of content requests (e.g., an application on a client device may request an image to display; a server hosting a website accessed by the client device may request a recommendation to display through the website; etc.). The model is used by the content serving platform to select content to provide in response to the content requests. Unfortunately, the performance, precision, and accuracy of the model to select the content that may be relevant and/or engaged with by users may decrease over time for various reasons. For example, this can occur because the model may have been previously trained at a point in time in the past, which may not take into account recent trends, changes in user preferences, new types of content, changes in user behavior, new users, etc.

Once the performance, precision, and accuracy of the model declines, a new model may be retrained. Routinely training new models is challenging, time consuming, and consumes a large amount of computing resources. Manual training of new models entails data collection of user behavior for training the new models, building an execution environment for training the new models, selecting a framework for training the new models, tuning hyperparameters for training the new models, and/or time consuming and resource intensive tasks. After training, the new models are evaluated offline to ensure that the output of the new models works as expected, and then the new models are deployed. This process consumes a large amount of computing resources, and involves a substantial amount of manual human effort. This can become even more problematic when there are limited computing resources available for the training of new models.

Accordingly, as provided herein, an automated model update pipeline is provided for automating the process of periodically training and deploying new models based upon up-to-date user behavior information. The automated model update pipeline may periodically implement an automated process to collect up-to-date user behavior data, train new models based upon the up-to-date user behavior data, evaluate the performance of the new models offline, update the new models and ranking profiles for the new models for serving content requests, and/or dynamically scoring models for real-time shifting of traffic for serving content requests among the models based upon the performance of the models.

The automated model update pipeline improves the performance, accuracy, and precision of content serving platforms that can now use more up-to-date and performant models that are trained based upon recent user behavior information for improved user engagement of content provided by the content serving platforms using these up-to-date and performant models. Thus, the automated model update pipeline improves the operation of computing devices hosting the content serving platforms. The content serving platform is more performant because more relevant and user engaging content is provided to users (e.g., achieving an increase of about 4.5% of user engagement) so that computing resources and network bandwidth is not wasted by otherwise providing content that will be ignored or that is annoying to users.

Because the automated model update pipeline automates data collection, model training, model performance evaluation, model deployment, and dynamic traffic shifting in a resource efficient and performant manner, computing resource consumption, time, and manual human effort are reduced. This is because merely a few configurations may be input into the automated model update pipeline, and then the automated model update pipeline is capable of automating the data collection, model training, model performance evaluation, model deployment, and dynamic traffic shifting. The automated model update pipeline may be configured to periodically perform data collection and model training so that up-to-date user behavior data can be used to train new models that will be more precise and accurate than already deployed models that do not take into account such up-to-date user behaviors. Furthermore, the automated model update pipeline can dynamically score/rank model based upon their performance, and shift traffic to the most performant models that take into account the recent up-to-date user behaviors using relatively less computing resources, which improves the operation of the computing devices hosting the content serving platforms that may otherwise be resource constrained.

Figure 4:
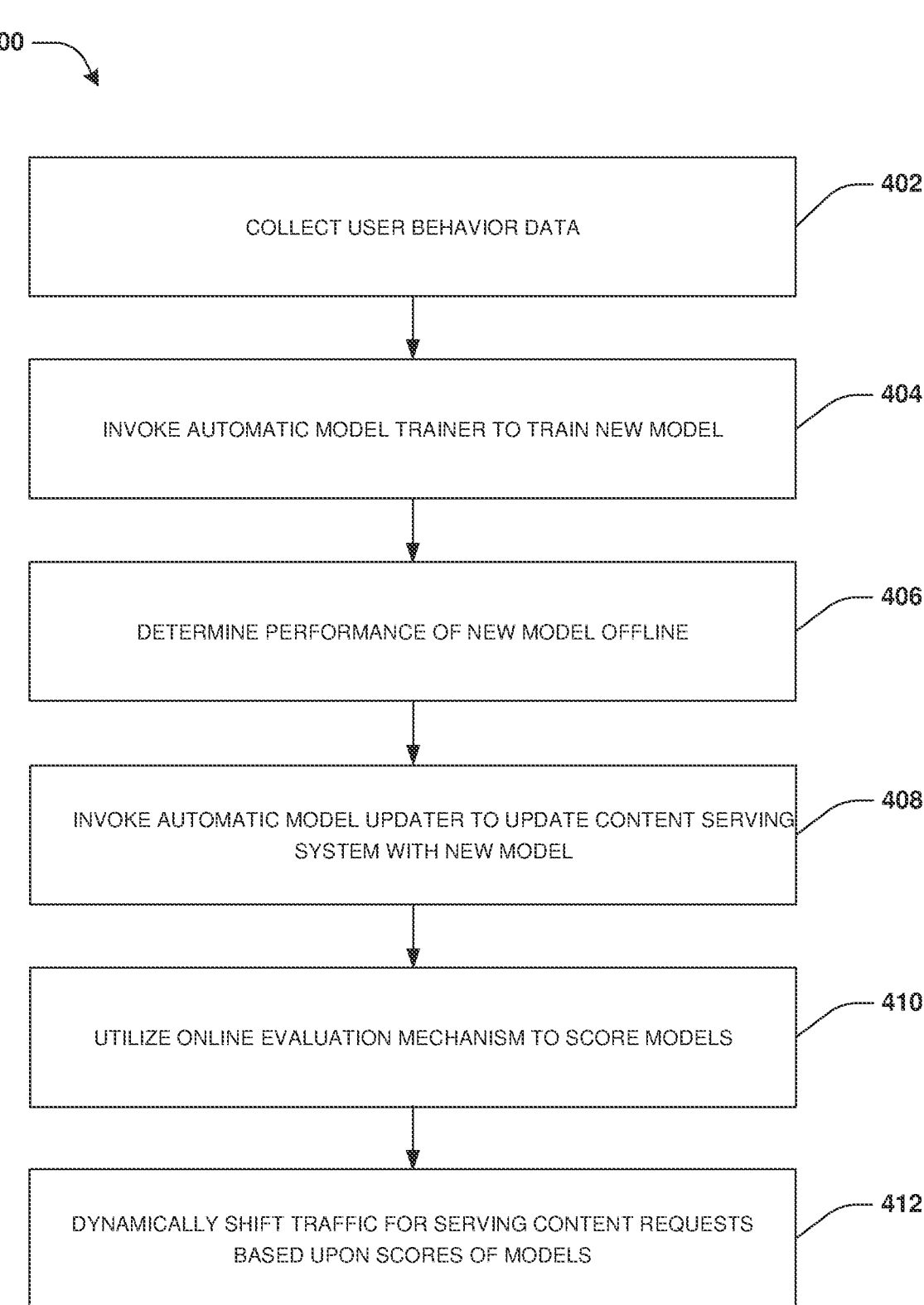
FIG. 4 is a flow chart illustrating an example method for implementing an automated model update pipeline.
Figure 5A:
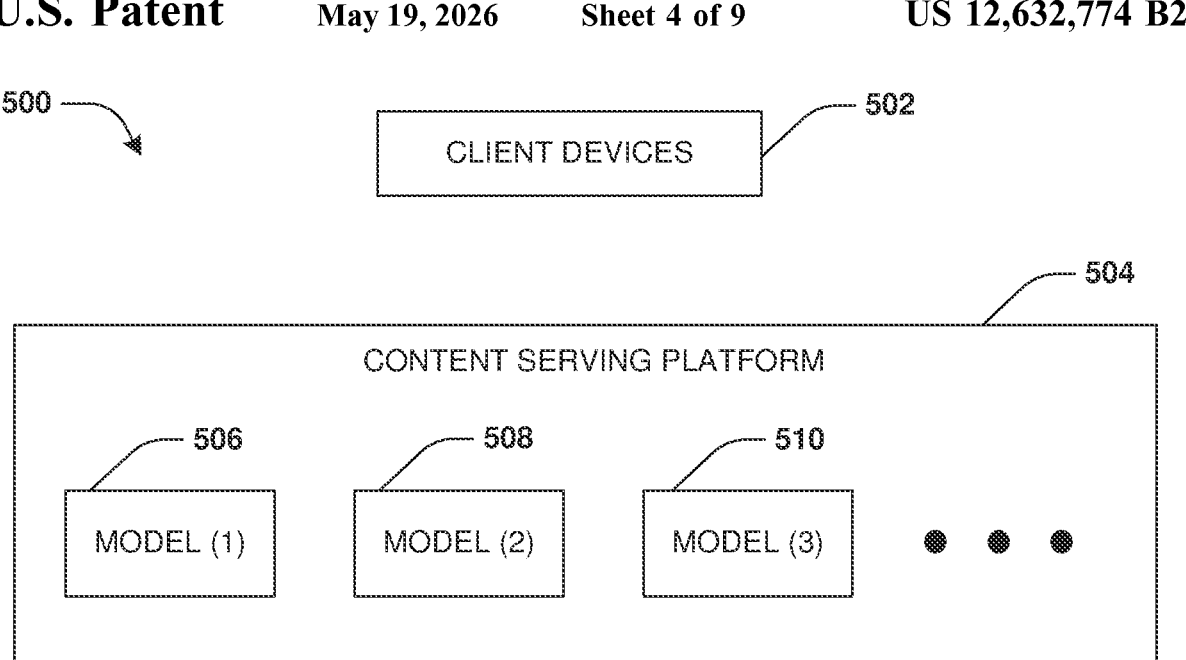
FIG. 5A is a component block diagram illustrating an example system for implementing an automated model update pipeline, where one or more new models are generated.
Figure 5A:
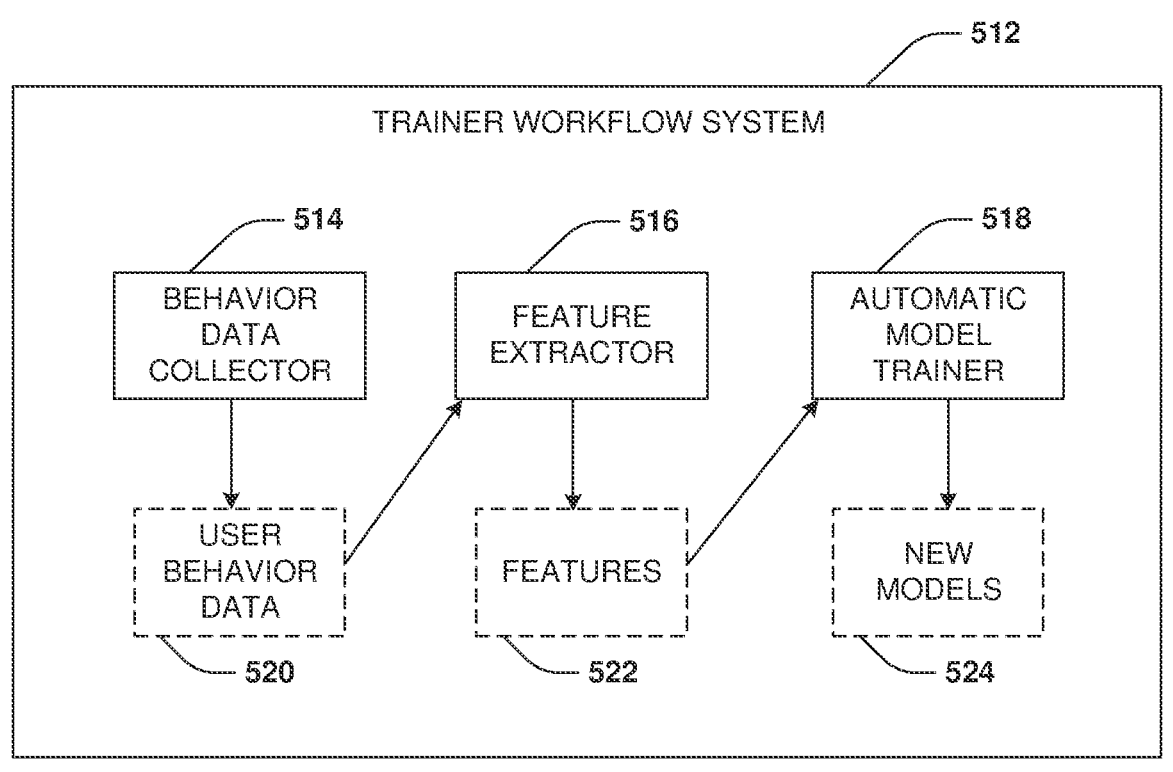

One embodiment of implementing an automated model update pipeline is illustrated by an exemplary method 400 of FIG. 4 and is further described in conjunction with system 500 of FIGS. 5A-5E. A content serving platform 504 may be configured to provide content (content items) to client devices 502, as illustrated by FIG. 5A. In an example, the content serving platform 504 may connect to the client devices 502 over a network. The content serving platform 504 may receive content requests from the client devices 502. The content requests may be received from various types of client devices. For example, an application (e.g., a news reader application, an email application, social network application, etc.) on a user device may transmit a content request to the content serving platform 504 for content to display through a user interface, such as an image, a video, text, a recommendation, a link to a website, etc. In another example, a service provider such as a provider of a website, may transmit a content request to the content serving platform 504 for content to include within a website or other user interface accessible to a user device.

The content serving platform 504 may utilize various deployed models for selecting what content to provide to certain client devices 502. For example, the content serving platform 504 may utilize a first deployed model 506, a second deployed model 508, a third deployed model 510, and/or other deployed models for selecting content to provide back in response to content requests from the client devices 502. The deployed models may select content based upon content features of the content (e.g., a topic or category of a recommendation, image, video, etc.) and/or user features of users (e.g., demographic information, user profile information, browsing history, prior user engagement with content, user search history, etc.) associated with the content requests.

Before deployment as the deployed models, models may be initially trained on user behavior data to predict what content users will be likely to engage with and what content the user will ignore or not engage with. After deployment, user behavior may change over time from what user behavior was initially used to train the now deployed models. Thus, the accuracy, precision, and performance of the deployed models may decrease over time. Computing resources and bandwidth are wasted in identifying content, transmitting the content from the content serving platform 504 to the client devices 502, and displaying that content that is not relevant and/or annoying to the user, and thus will be ignored by the user.

Accordingly, the automated model update pipeline may be configured to obtain up-to-date user behavior data, and train new models based upon the up-to-date user behavior data. The new models may be relatively more accurate, precise, and/or performant than the already deployed models that were previously trained on what is now stale user behavior data.

In an embodiment, the automated model update pipeline may comprise a trainer workflow system 512 configured to obtain the up-to-date user behavior data, and train the new models based upon the up-to-date user behavior data. In an embodiment, the trainer workflow system 512 may comprise a user behavior data collector 514 configured to collect the up-to-date user behavior data. Accordingly, during operation 402 of the method 400, the user behavior data collector 514 of the trainer workflow system 512 may collect user behavior data 520 (recent/up-to-date user behavior data) from various sources. For example, the user behavior data 520 may correspond to content that was provided to users, and how the users reacted to that content (e.g., ignored the content, viewed the content, clicked the content, performed an action related to the content, sent a message or posted a social network post about the content, purchased a product or service, etc.), which may be collected from various content serving platforms such as the content serving platform 504. Other types of user behavior data 520 may be collected from other sources, such as social network posts, browsing history, search history, purchasing information, email receipts, information within messages and emails, locations visited by users, articles read by users, and/or a wide variety of other types of user behavior data 520.

In an embodiment, the trainer workflow system 512 comprises a feature extractor 516. The feature extractor 516 of the trainer workflow system 512 takes the user behavior data 520 as input. Based upon the user behavior data 520 as input, the feature extractor 516 output features 522 that are extracted by the feature extractor 516 from the user behavior data 520. The features 522 may be indicative of what types of actions or inactions certain users (e.g., user features) performed with respect to certain types of content (e.g., content features).

In an embodiment, the trainer workflow system 512 comprises an automatic model trainer 518. The trainer workflow system 512 may configure the automatic model trainer 518 to train new models 524 using the user behavior data 520 such as the features 522 extracted by the feature extractor 516 from the user behavior data 520. Accordingly, during operation 404 of the method 400, the automatic model trainer 518 of the trainer workflow system 512 may train the new models 524 to output a set of model parameters based upon a configuration specifying a target audience, the features 522 extracted from the user behavior data 520, and/or training model parameters. In an embodiment, the automatic model trainer 518 of the trainer workflow system 512 may train the new models 524 to output the set of model parameters based upon training variables associated with filters for the user behavior data 520, a location to read the user behavior data 520, and/or a tuning range for hyperparameters used to train the new models 524.

The trainer workflow system 512 may configure the automatic model trainer 518 to also test the new models 524 and/or release the new models 524 for deployment for serving content requests. For example, the automatic model trainer 518 of the trainer workflow system 512 may perform an offline evaluation of the new models 524. The automatic model trainer 518 may perform the offline evaluation to determine whether the new models 524 are performing as expected. The offline evaluation may correspond to the automatic model trainer 518 using the new models 524 to determine whether users with certain user features would interact with certain content. Prior user interactions of users, having particular user features, with content, having particular content features, may be used by the automatic model trainer 518 as evaluation data to determine whether the new models 524 are correctly selecting content for users that previously engaged with such content and thus having a high performance, accuracy, and/or precision or whether the new models are incorrectly selecting content for users that previously ignored such content and thus have low performance, accuracy, and/or precision. The automatic model trainer 518 may perform the offline evaluation such that the new models 524 are offline generating predictions as to likelihoods of users interacting with content (e.g., ranking content items based upon how likely a new model has predicted that a user will interact with the content items), but the content is not actually being used to actively serve content requests.

During operation 406 of the method 400, the automatic model trainer 518 of the trainer workflow system 512 may perform the offline evaluation to predict performance of the new models 524 based upon evaluation metrics. In an embodiment, the evaluation metrics may comprise precision evaluation metrics, recall evaluation metrics, area under curve evaluation metrics, normalized discounted cumulative gain evaluation metrics, and/or other evaluation metrics. In this way, the automatic model trainer 518 of the trainer workflow system 512 may determine offline performance of the new models 524 based upon the evaluation metrics.

The automatic model trainer 518 of the trainer workflow system 512 may determine performance of the deployed models used by the content serving platform 504 to actively serve traffic of content requests, such as performance of the first deployed model 506, performance of the second deployed model 508, performance of the third deployed model 510. The performance of the deployed models may be based upon whether and how users interacted with content (e.g., ignored content, viewed content, clicked content, performed an action after viewing content, made a purchase associated with content, etc.) selected by the deployed models and provided by the content serving platform 504 to the client devices 502. If a deployed model ranks/scores content items as having high likelihoods that users will engage with the content items but the users ignore the content items, then that deployed model may have a low performance compared to another model that ranks/scores content items as having high likelihoods that users will engage with the content items and the users do interact with the content items.

Once the automatic model trainer 518 of the trainer workflow system 512 determines the performance of the deployed models and determines the offline performance of the new models 524, performance of the new models 524 and the deployed models may be compared to determine whether any of the new models 524 would outperform the deployed models. Accordingly, during operation 408 of the method 400, an automatic model updater 523 of the automated model update pipeline may identify a new model 536 that will outperform a deployed model on the content serving platform 504, as illustrated by FIG. 5B. Accordingly, the automatic model updater 523 of the automated model update pipeline is invoked to update the content serving platform 504 with the new model 536 and a ranking profile 534 of the new model 536.

In an embodiment, the automatic model updater 523 of the automated model update pipeline may be configured to update a remote repository associated with the content serving platform 504 with the new models 524 and ranking profiles of the new models 524. In an embodiment, a continuous integration and continuous delivery pipeline of the automated model update pipeline may be configured to periodically scan and verify new models, such as the new models 524, as the new models are generated and trained by the automatic model trainer 518 of the trainer workflow system 512. The continuous integration and continuous delivery pipeline of the automated model update pipeline may commit changes of the verified models (verified new models) to new branches within the remote repository of the content serving platform 504. In response to the continuous integration and continuous delivery pipeline of the automated model update pipeline committing the changes to the new branches, a pull request may be raised to obtain review for the new branches for subsequent deployment for actively serving content requests.

Figure 5C:
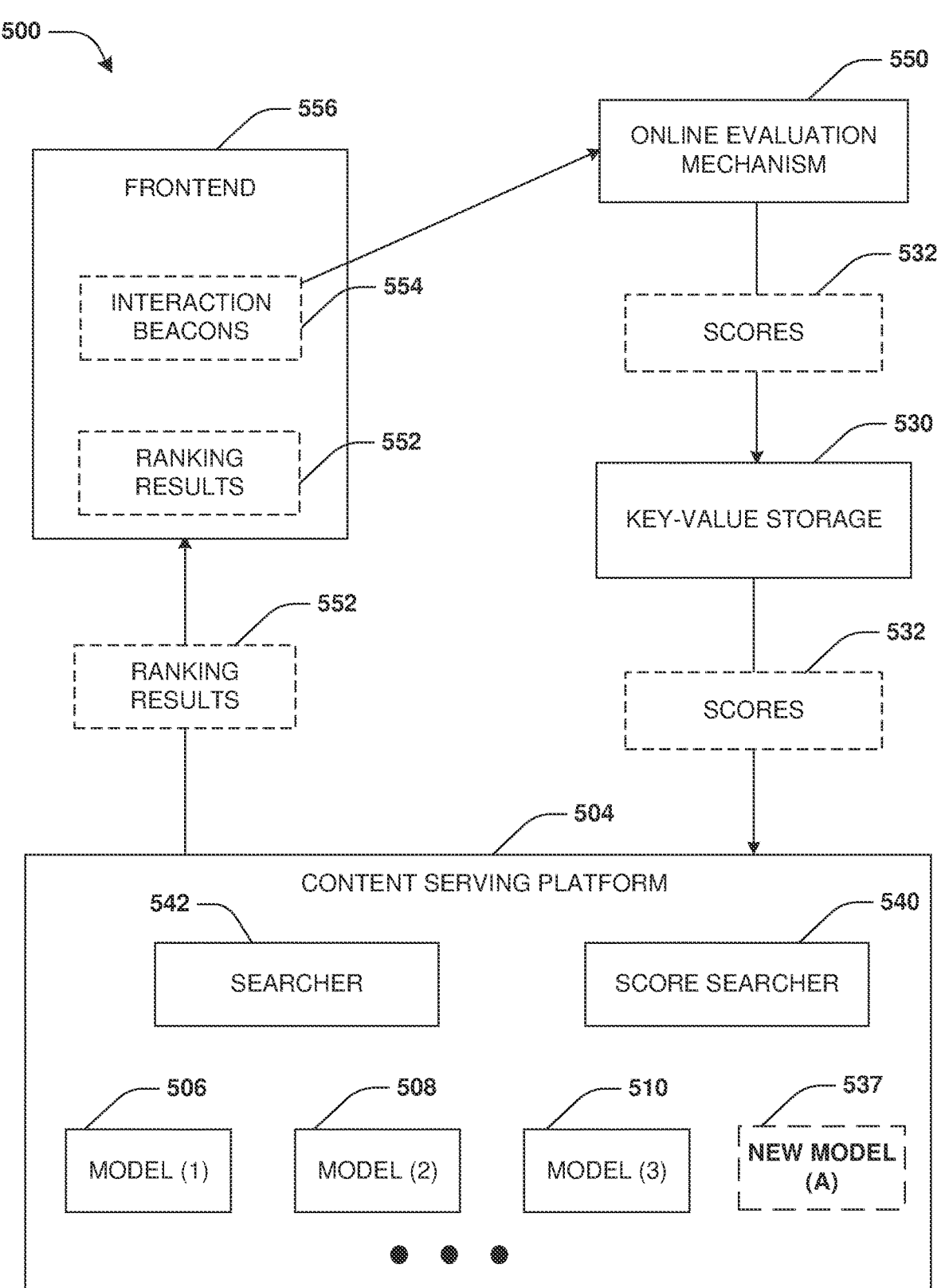
FIG. 5C is a component block diagram illustrating an example system for implementing an automated model update pipeline, where traffic is dynamically shifted amongst models.

The content serving platform 504 may utilize a new model, such as a new model (A) 537, for actively serving content requests from the client devices 502, as illustrated by FIG. 5C. In an embodiment, the content serving platform 504 may utilize the new model (A) 537 to serve exploitation traffic of content requests. The exploitation traffic may correspond to serving content items that the new model (A) 537 can accurately predict user engagement for the content items because the new model (A) 537 has been trained based upon past user engagement with the content items or similar types of content items. In an embodiment, the content serving platform 504 may utilize the new model (A) 537 to serve exploration traffic of content requests. The exploration traffic may correspond to content items for which the new model (A) 537 has yet to be trained to accurately predict user engagement, such as relatively newer content items, that will be explored to learn what types of users, having certain user features, engage with and/or do not engage with these content items.

In an embodiment, the automated model update pipeline may comprise an online evaluation mechanism 550. The online evaluation mechanism 550 of the automated model update pipeline may be configured to exploit and/or explore a plurality of models of the content serving platform 504 for content requests. The plurality of models may comprise the first deployed model 506, the second deployed model 508, the third deployed model 510, the new model (A) 537, and/or other deployed models and new models. In an embodiment, the online evaluation mechanism 550 may assign scores 532 to the plurality of models based upon performance of the models serving content requests, during operation 410 of the method 400. The more a model selects content that is provided by the content serving platform 504 to users that engage with the content (e.g., the more the model ranks content as having high likelihoods of being engaged with, and that content is actually engaged with), the better the performance and the higher a score assigned to the model compared to a model that selects content that is provided by the content serving platform 504 to users that ignore the content. In an embodiment, the online evaluation mechanism 550 of the automated model update pipeline may utilize a multi-armed bandit mechanism to assign the scores 532 to the plurality of models.

The scores 532 may be stored by the online evaluation mechanism 550 into key-value storage 530. The key-value storage 530 may be made accessible to the content serving platform 504, such as by being made accessible to a score searcher 540 that can retrieve the scores 532 from the key-value storage 530. The scores 532 may be used to select one or more models out of the plurality of models of the content serving platform 504 for serving content requests based upon the one or more models having scores above a threshold (e.g., higher scores compared to other models of the plurality of models). In this way, a select model may be selected out of the plurality of models of the content serving platform 504 for serving content requests based upon the select model having a score greater than scores of other models within the plurality of models.

The multi-armed bandit mechanism may utilize a Bayesian upper confidence bounds algorithm to score and select a particular model from the plurality of models to route incoming traffic for serving content requests. It may be appreciated that other bandit algorithms may be utilized, such as an Epsilon Greedy algorithm, a Thompson Sampling algorithm, and/or other algorithms. In an embodiment, the online evaluation mechanism 550 of the automated model update pipeline may be configured to periodically evaluate the performance of the plurality of models of the content serving platform 504, and dynamically shift traffic for serving content request amongst the plurality of models based upon the performance of the plurality of models, such as based upon the scores 532, which may be determined and/or updated in real-time or near real-time as the models are used to serve traffic, during operation 412 of the method 400. In an embodiment, the online evaluation mechanism 550 of the automated model update pipeline may evaluate the performance of the new model (A) 537 that is used by the content serving platform 504 to serve a first portion of incoming traffic for serving content requests. The online evaluation mechanism 550 of the automated model update pipeline may evaluate performance of the first deployed model 506 (or any other model of the content serving platform) that is used by the content serving platform 504 to serve a second portion of incoming traffic for serving content requests. The online evaluation mechanism 550 of the automated model update pipeline may adjust at least one of the first portion of the incoming traffic or the second portion of the incoming traffic based upon the performance of the new model (A) 537 and the performance of the first deployed model 506 (or any other model of the content serving platform). In this way, more traffic may be routed to better performing models, while less traffic may be routed to less performant models.

In an embodiment of the online evaluation mechanism 550 of the automated model update pipeline assigning the scores 532 to the plurality of models, a searcher component 542 of the content serving platform 504 is configured to generate ranking results 552. The ranking results 552 may correspond to ranks related to content ranked by the models for the content serving platform 504 to provide to the client devices 502 through a frontend 556. The ranking results 552 may relate to how the models ranked the content according to how likely a user will interact with the content. For example, a content request for content may be received from a client device of a user by the content serving platform 504. The content request may be routed to the new model (A) 537 for ranking available content items (content) according to how likely the user will interact with each available content items. In this way, the ranking results 552 are generated and provided to the frontend 556. The frontend 556 may display one or more of the content items of the ranking results 552 to the user.

The frontend 556 may maintain interaction beacons 554 used to track whether the user interacted with the content items or not (e.g. whether the user viewed a content item, clicked a content item, performed an action after viewing a content item, etc.) and/or whether other users interacted with content items provided to those users. The online evaluation mechanism 550 may obtain the interaction beacons 554, and utilize the interaction beacons 554 to understand whether users interacted with content items predicted/scored/ranked by the models as having high likelihoods of being interacted with. Thus, the online evaluation mechanism 550 can assign the scores 532 to the models based upon whether the interaction beacons 554 from the frontend 556 indicate that the models correctly predicted/scored/ranked contents that were indeed interacted with by users or made incorrect predictions/scores/ranks and thus users did not interact with the content items provided to the users.

Figure 5D:
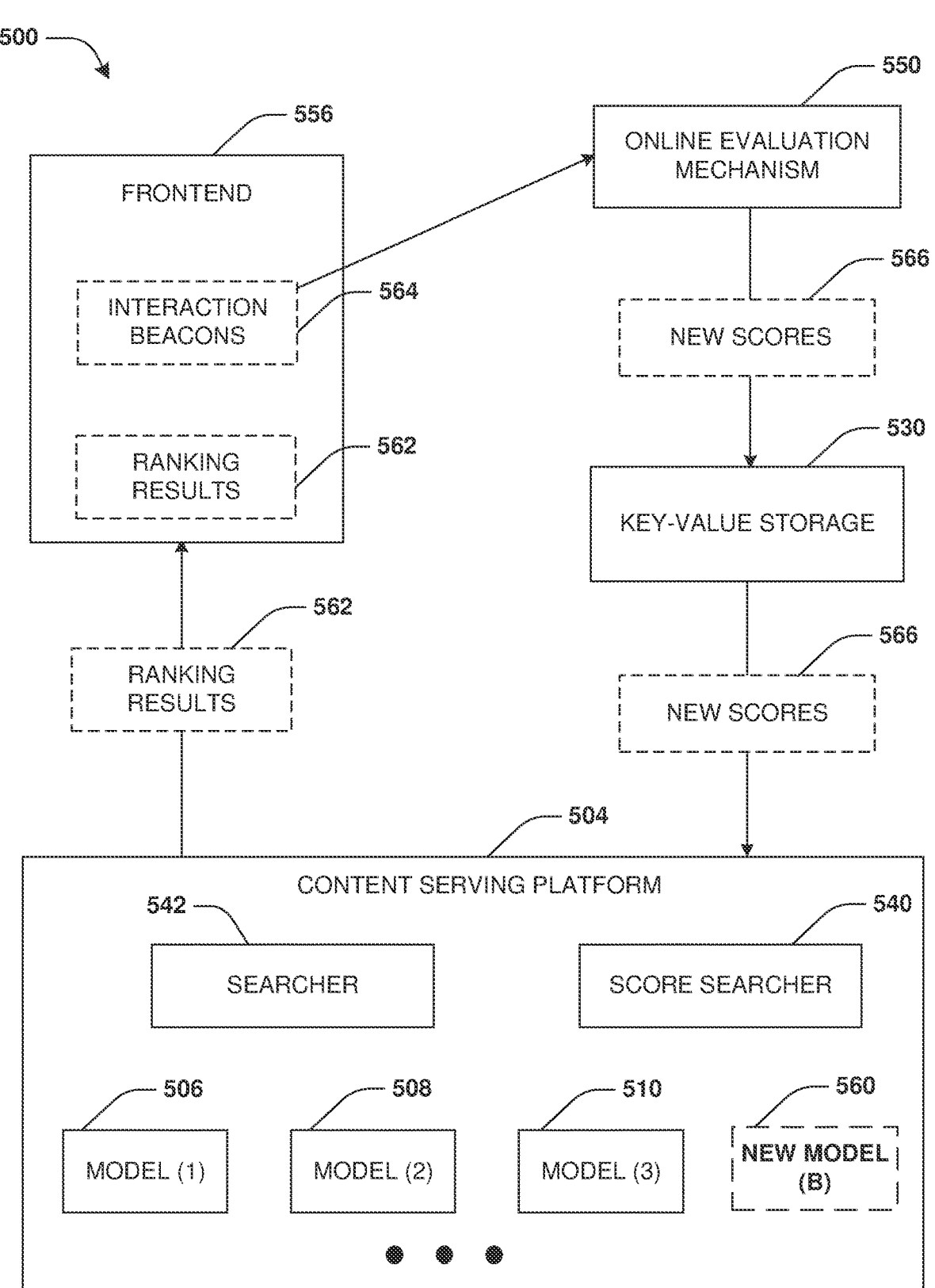
FIG. 5D is a component block diagram illustrating an example system for implementing an automated model update pipeline, where traffic is dynamically shifted amongst models.

FIG. 5D illustrates an example where a new model (B) 560 has been trained and updated to the content serving platform 504 for serving content requests (e.g., the new model (B) 560 may have been trained to replace the new model (A) 537 based upon the new model (B) 560 outperforming the new model (A) 537). Accordingly, the new model (B) 560 may be used to rank content items according to how likely users will interact with the content items, resulting in ranking results 562 that are provided to the frontend 556 so that one or more highest ranked content items may be provided to the users. The frontend 556 may track interaction beacons 564 that are provided to the online evaluation mechanism 550 for assigning new scores 566 to the plurality of models, such as the first deployed model 506, the second deployed model 508, the third deployed model 510, and the new model (B) 560.

Figure 5E:
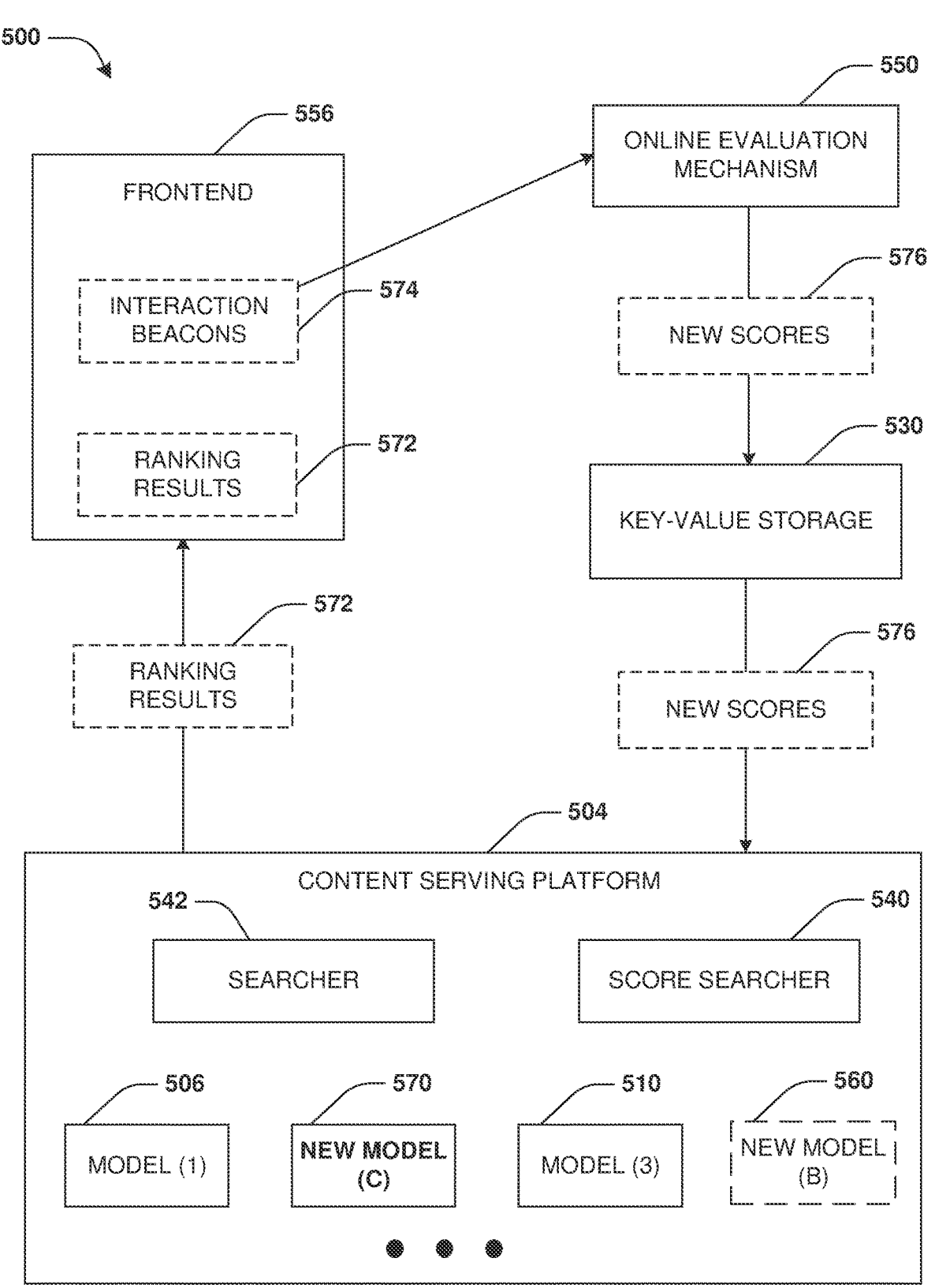
FIG. 5E is a component block diagram illustrating an example system for implementing an automated model update pipeline, where traffic is dynamically shifted amongst models.

FIG. 5E illustrates an example where a new model (C) 570 has been trained and updated to the content serving platform 504 for serving content requests (e.g., the new model (C) 570 may have been trained to replace the second deployed model 508 based upon the new model (C) 570 outperforming the second deployed model 508). Accordingly, the new model (C) 570 may be used to rank content items according to how likely users will interact with the content items, resulting in ranking results 572 that are provided to the frontend 556 so that one or more highest ranked content items may be provided to the users. The frontend 556 may track interaction beacons 574 that are provided to the online evaluation mechanism 550 for assigning new scores 576 to the plurality of models, such as the first deployed model 506, the new model (C) 570, the third deployed model 510, and the new model (B) 560.

In this way, the automated model update pipeline implements an automated process to collect up-to-date user behavior data, train new models on the up-to-date user behavior data, evaluate the performance of the new models offline, update the new models and ranking profiles for the new models for serving content requests, and dynamically shift traffic for serving content requests amongst a plurality of models based upon the performance of the plurality of models.

Figure 6:
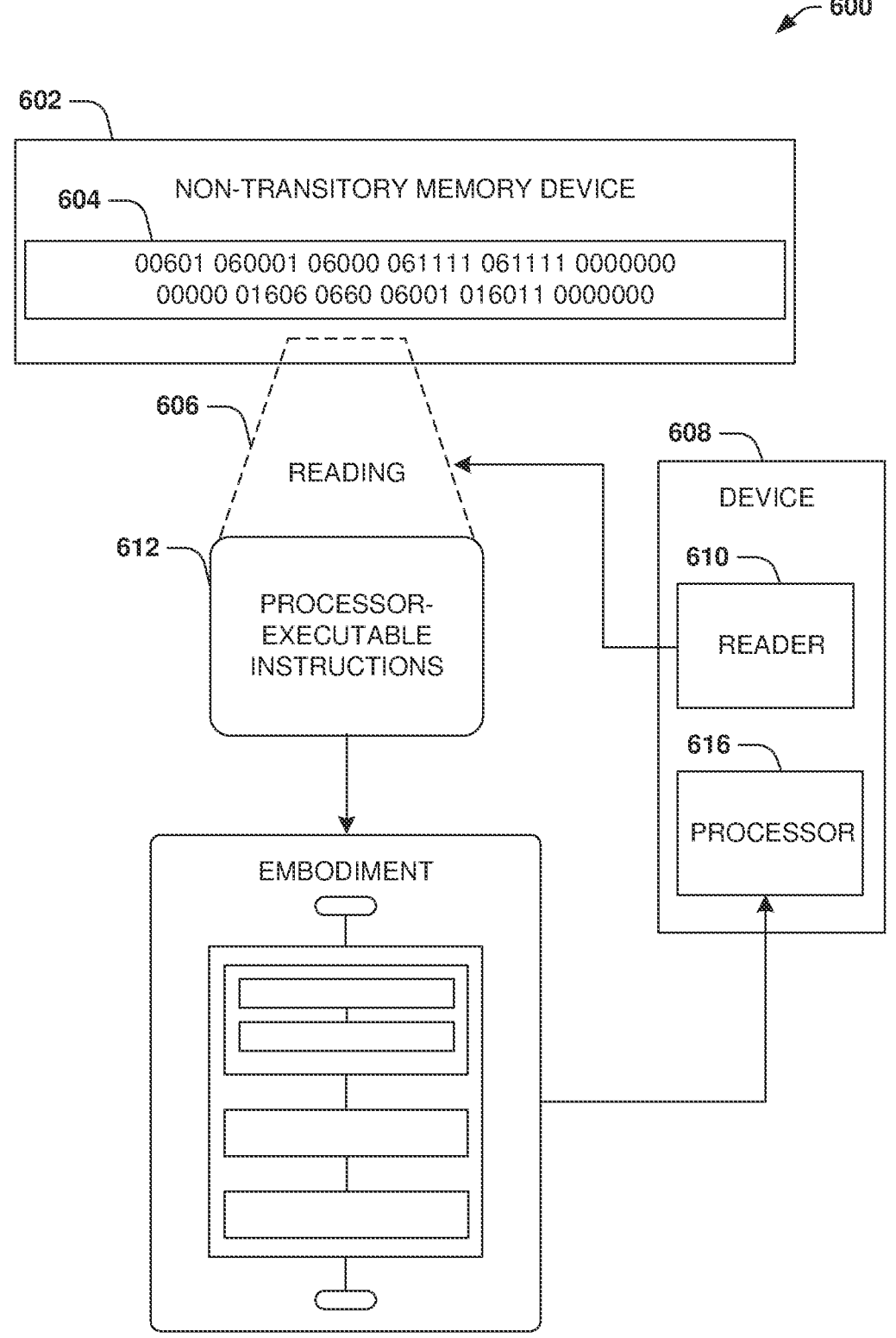
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIG. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
collecting user behavior data associated with content provided to users;
invoking an automatic model trainer of a trainer workflow system to train a new model to output a set of model parameters based upon a configuration specifying a target audience, features extracted from the user behavior data, and training model parameters;
in response to determining that the new model will outperform a deployed model on a content serving platform, invoking an automatic model updater to update the content serving platform with the new model and a ranking profile of the new model for serving content requests;
utilizing a multi-armed bandit algorithm to evaluate a plurality of models for content requests for transmitting traffic from a server to one or more remote computing devices;
configuring an online evaluation mechanism to periodically assign one or more scores to the plurality of models, including the new model and the deployed model, available to the content serving platform based upon the evaluations of performance of the plurality of models determined utilizing the multi-armed bandit algorithm;
responsive to collecting up-to-date user behavior data corresponding to a plurality of users, training at least some of the plurality of models on the up-to-date user behavior data corresponding to the plurality of users, evaluating performance of the trained models, and updating at least some scores for the trained models to generate updated scores, dynamically shifting traffic for serving the content requests amongst the plurality of models based upon the periodically assigned one or more scores associated with performance of the plurality of models;

configuring a continuous integration and continuous delivery pipeline to periodically scan and verify new models as the new models are generated and trained by the automatic model trainer of the trainer workflow system;
in response to the continuous integration and continuous delivery pipeline identifying a verified model, committing changes to a new branch within a remote repository of the content serving platform based upon the verified model; and
in response to the continuous integration and continuous delivery pipeline committing the changes to the new branch, raising a pull request to obtain review for the new branch.

2. The method of claim 1, comprising:
performing an offline evaluation of the new model to predict performance of the new model based upon evaluation metrics; and
compare the performance of the new model to performance of the deployed model to determine whether the new model out performs the deployed model.

3. The method of claim 2, wherein the evaluation metrics comprise at least one of precision, recall, area under curve, or normalized discounted cumulative gain.

4. The method of claim 1, comprising:
utilizing an online evaluation mechanism to score a plurality of models, including the new model and the deployed model, available to the content serving platform.

5. The method of claim 4, wherein the online evaluation mechanism utilizes a multi-armed bandit mechanism to score the plurality of models.

6. The method of claim 5, wherein the multi-armed bandit mechanism utilizes a Bayesian upper confidence bounds algorithm to select a selected model out of the plurality of models to route incoming traffic for serving the content requests.

7. The method of claim 4, comprising:
selecting a selected model out of the plurality of models for serving the content requests based upon the selected model having a score greater than scores of other models within the plurality of models.

8. The method of claim 1, comprising:
evaluating performance of the new model used to serve a first portion of incoming traffic for serving the content requests;
evaluating performance of the deployed model used to serve a second portion of incoming traffic for serving the content requests; and
adjusting at least one of the first portion or the second portion of the incoming traffic based upon the performance of the new model and the performance of the deployed model.

9. The method of claim 1, comprising:
configuring the automatic model trainer with training variables associated with filters for the user behavior data, a location to read the user behavior data, and a tuning range for hyperparameters.

10. The method of claim 1, comprising:
configuring the automatic model trainer with training variables associated with filters for the user behavior data.

11. The method of claim 1, comprising:
configuring the automatic model trainer with training variables associated with a location to read the user behavior data.

12. The method of claim 1, comprising:

configuring the automatic model trainer with training variables associated with a tuning range for hyperparameters.

13. A non-transitory machine readable medium having stored thereon processor-executable instructions that when executed cause performance of operations, the operations comprising:

training a new model to output a set of model parameters based upon a configuration specifying a target audience, features extracted from user behavior data, and training model parameters;

in response to determining that the new model will outperform a deployed model on a content serving platform, invoking an automatic model updater to update the content serving platform with the new model and a ranking profile of the new model for serving content requests;

utilizing a multi-armed bandit algorithm to evaluate a plurality of models for content requests for transmitting traffic from a server to one or more remote computing devices;

configuring an online evaluation mechanism to periodically assign one or more scores to the plurality of models, including the new model and the deployed model, available to the content serving platform based upon the evaluations of performance of the plurality of models determined utilizing the multi-armed bandit algorithm;

responsive to collecting up-to-date user behavior data corresponding to a plurality of users, training at least some of the plurality of models on the up-to-date user behavior data corresponding to the plurality of users, evaluating performance of the trained models, and updating at least some scores for the trained models to generate updated scores, dynamically shifting traffic for serving the content requests amongst the plurality of models based upon the periodically assigned one or more scores associated with performance of the plurality of models;

configuring a continuous integration and continuous delivery pipeline to periodically scan and verify new models as the new models are generated and trained by an automatic model trainer of a trainer workflow system;

in response to the continuous integration and continuous delivery pipeline identifying a verified model, committing changes to a new branch within a remote repository of the content serving platform based upon the verified model; and in response to the continuous integration and continuous delivery pipeline committing the changes to the new branch, raising a pull request to obtain review for the new branch.

14. The non-transitory machine readable medium of claim 13, wherein the operations comprise:

utilizing the new model to serve exploitation traffic of a content request.

15. The non-transitory machine readable medium of claim 13, wherein the operations comprise:

ranking the performance of the models using a multi-armed bandit mechanism.

16. The non-transitory machine readable medium of claim 13, wherein the operations comprise:

utilizing the new model to serve exploration traffic of a content request.

17. The non-transitory machine readable medium of claim 13, wherein the operations comprise:

configuring an automatic model trainer to train new models using user behavior data, testing the new models, and releasing the new models for deployment for serving the content requests.

18. The non-transitory machine readable medium of claim 13, wherein the operations comprise:

configuring the automatic model trainer with training variables associated with at least one of filters for the user behavior data, a location to read the user behavior data, or a tuning range for hyperparameters.

19. A computing device comprising:

a processor; and memory comprising processor-executable instructions that when executed by the processor cause performance of operations, the operations comprising:

training a new model to output a set of model parameters based upon a configuration specifying a target audience, features extracted from user behavior data, and training model parameters;

in response to determining that the new model will outperform a deployed model on a content serving platform, invoking an automatic model updater to update the content serving platform with the new model and a ranking profile of the new model for serving content requests;

utilizing a multi-armed bandit algorithm to evaluate a plurality of models for content requests for transmitting traffic from a server to one or more remote computing devices;

configuring an online evaluation mechanism to periodically assign one or more scores to the plurality of models, including the new model and the deployed model, available to the content serving platform based upon the evaluations of performance of the plurality of models determined utilizing the multi-armed bandit algorithm;

responsive to collecting up-to-date user behavior data corresponding to a plurality of users, training at least some of the plurality of models on the up-to-date user behavior data corresponding to the plurality of users, evaluating performance of the trained models, and updating at least some scores for the trained models to generate updated scores, dynamically shifting traffic for serving the content requests amongst the plurality of models based upon the periodically assigned one or more scores associated with performance of the plurality of models;

configuring a continuous integration and continuous delivery pipeline to periodically scan and verify new models as the new models are generated and trained by an automatic model trainer of a trainer workflow system;

in response to the continuous integration and continuous delivery pipeline identifying a verified model, committing changes to a new branch within a remote repository of the content serving platform based upon the verified model; and in response to the continuous integration and continuous delivery pipeline committing the changes to the new branch, raising a pull request to obtain review for the new branch.

20. The computing device of claim 19, wherein the computing device periodically implements an automated process to collect up-to-date user behavior data, train new models on the up-to-date user behavior data, evaluate performance of the new models offline, update the new models and ranking profiles for the new models for serving content requests, and dynamically shift traffic for serving content requests amongst the plurality of models based upon performance of the plurality of models.

* * * * *